United States Patent
Song et al.

(10) Patent No.: US 10,990,860 B2
(45) Date of Patent: Apr. 27, 2021

(54) CALIBRATION CHART BASED IMAGE FORMING APPARATUS

(71) Applicant: Hewlett-Packard Development Company, L.P., Spring, TX (US)

(72) Inventors: Eunah Song, Seongnam-si (KR); Kimin Kang, Seongnam-si (KR); Minki Cho, Seongnam-si (KR); Yousun Bang, Seongnam-si (KR); Seongwook Han, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/621,075

(22) PCT Filed: Jun. 1, 2018

(86) PCT No.: PCT/KR2018/006270
§ 371 (c)(1),
(2) Date: Dec. 10, 2019

(87) PCT Pub. No.: WO2019/054604
PCT Pub. Date: Mar. 21, 2019

(65) Prior Publication Data
US 2020/0193247 A1 Jun. 18, 2020

(30) Foreign Application Priority Data
Sep. 18, 2017 (KR) .................. 10-2017-0119460

(51) Int. Cl.
*G06K 15/02* (2006.01)
*G03G 15/00* (2006.01)
(Continued)

(52) U.S. Cl.
CPC ....... *G06K 15/027* (2013.01); *G03G 15/0142* (2013.01); *G03G 15/5058* (2013.01);
(Continued)

(58) Field of Classification Search
CPC .......... G03G 15/0142; G03G 15/5058; G03G 15/5062; G03G 15/55; G06K 15/027;
(Continued)

(56) References Cited

U.S. PATENT DOCUMENTS 6,016,207 A * 1/2000 Wield ................ H04N 1/00002
358/406
7,545,536 B2 * 6/2009 Hayashi ............... H04N 1/6033
345/589

(Continued)

FOREIGN PATENT DOCUMENTS

EP 2811730 A2 12/2014

*Primary Examiner* — Negussie Worku
(74) *Attorney, Agent, or Firm* — Jefferson IP Law, LLP

(57) ABSTRACT

An image forming apparatus is provided. The image forming apparatus includes an image former to change a transfer condition while printing a calibration chart in which patches of different colors are repeatedly arranged in a sub-scanning direction, a scanner to scan the printed calibration chart, and a processor to determine an image defect under each transfer condition using the scanned calibration chart, and to set a transfer condition of the image former based on the determined image defect.

19 Claims, 13 Drawing Sheets

(51) Int. Cl.
*G06T 7/00* (2017.01)
*G03G 15/01* (2006.01)
*G06K 15/12* (2006.01)

(52) U.S. Cl.
CPC .......... *G06K 15/129* (2013.01); *G06T 7/0002* (2013.01); *G06T 2207/10008* (2013.01); *G06T 2207/10024* (2013.01); *G06T 2207/30168* (2013.01)

(58) Field of Classification Search
CPC ............. G06K 15/129; G06K 15/1836; G06K 15/1851; G06K 15/007; G06T 2207/10008; G06T 2207/10024; G06T 2207/30168; G06T 7/0002; G06T 7/6033; H04N 1/00045; H04N 1/00087; H04N 1/00023; H04N 1/00002; H04N 1/00063; H04N 2201/0094; H04N 1/00013; H04N 1/00015; H04N 1/00031; H04N 2201/0082; H04N 1/00034; H04N 1/00053; H04N 1/00076; H04N 1/0009; H04N 1/00702; H04N 1/00018; H04N 1/00058; H04N 1/603; H04N 1/6055; H04N 1/00005; H04N 1/0005; H04N 1/00068; H04N 1/00278; H04N 1/00411; H04N 1/00708; H04N 1/00724; H04N 1/00726; H04N 1/00734; H04N 1/00748; H04N 1/00769; H04N 1/00774; H04N 1/00779; H04N 1/401; H04N 1/4078; H04N 1/56; H04N 1/6008; H04N 1/6044; H04N 1/6058; H04N 1/6072; H04N 2201/0005; H04N 1/00082; H04N 1/0473; H04N 1/12; H04N 1/193; H04N 1/38; H04N 2201/0081; H04N 2201/04703; H04N 2201/04717; H04N 2201/04732; H04N 2201/04756; H04N 2201/04793; G01J 3/52; G01J 3/524
USPC ....................................................... 358/504
See application file for complete search history.

(56) References Cited

U.S. PATENT DOCUMENTS

| | | | |
|---|---|---|---|
| 8,843,003 B2 | 9/2014 | Nakao | |
| 9,390,493 B2* | 7/2016 | Kitai | G06T 7/001 |
| 9,524,545 B2* | 12/2016 | Fukase | G06T 7/001 |
| 10,296,271 B2* | 5/2019 | Watanabe | G06K 15/14 |
| 10,635,012 B2* | 4/2020 | Kashiwakura | G03G 15/0115 |
| 10,681,234 B2* | 6/2020 | Ogawa | H04N 1/00777 |
| 2002/0031372 A1* | 3/2002 | Iida | G03G 15/11 |
| | | | 399/249 |
| 2009/0231645 A1* | 9/2009 | Hayashi | H04N 1/00053 |
| | | | 358/520 |
| 2010/0177365 A1* | 7/2010 | Chung | H04N 1/6033 |
| | | | 358/504 |
| 2011/0019245 A1 | 1/2011 | Adachi | |
| 2014/0016149 A1* | 1/2014 | Matsuzaki | H04N 1/00005 |
| | | | 358/1.9 |
| 2014/0160498 A1* | 6/2014 | Yano | G06F 3/1208 |
| | | | 358/1.9 |
| 2014/0211268 A1 | 7/2014 | Huang et al. | |
| 2015/0138588 A1 | 5/2015 | Matsuzaki | |
| 2015/0168901 A1* | 6/2015 | Yasuda | G03G 15/55 |
| | | | 399/72 |
| 2015/0170008 A1 | 6/2015 | Hashizume | |
| 2016/0044211 A1* | 2/2016 | Yamaguchi | H04N 1/6033 |
| | | | 358/2.1 |
| 2016/0379095 A1* | 12/2016 | Nozawa | G01J 3/52 |
| | | | 358/1.9 |
| 2017/0280022 A1* | 9/2017 | Kuroiwa | H04N 1/6097 |
| 2019/0193441 A1* | 6/2019 | Morovic | B41J 29/393 |

* cited by examiner

[Fig. 1]
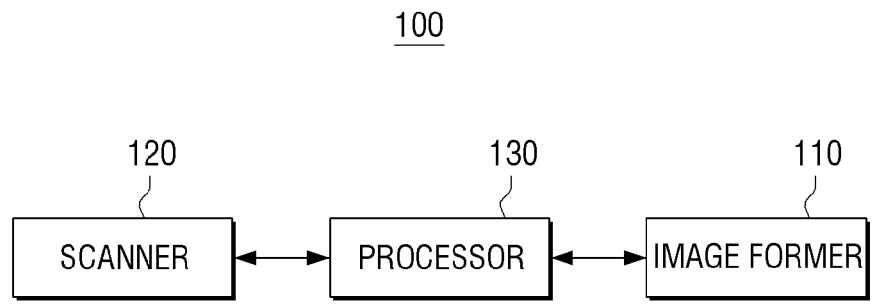
[Fig. 2]
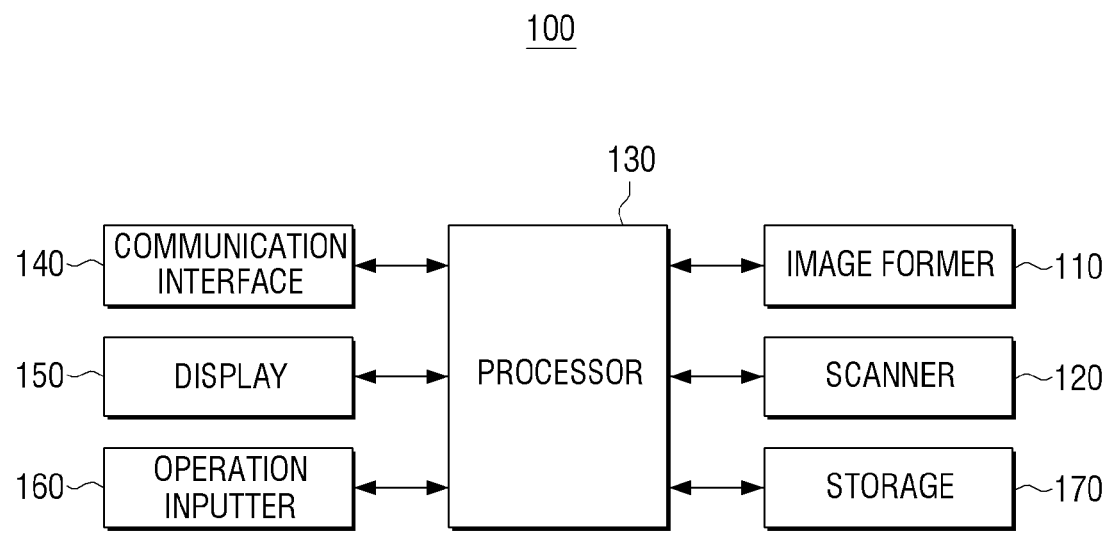
[Fig. 3]
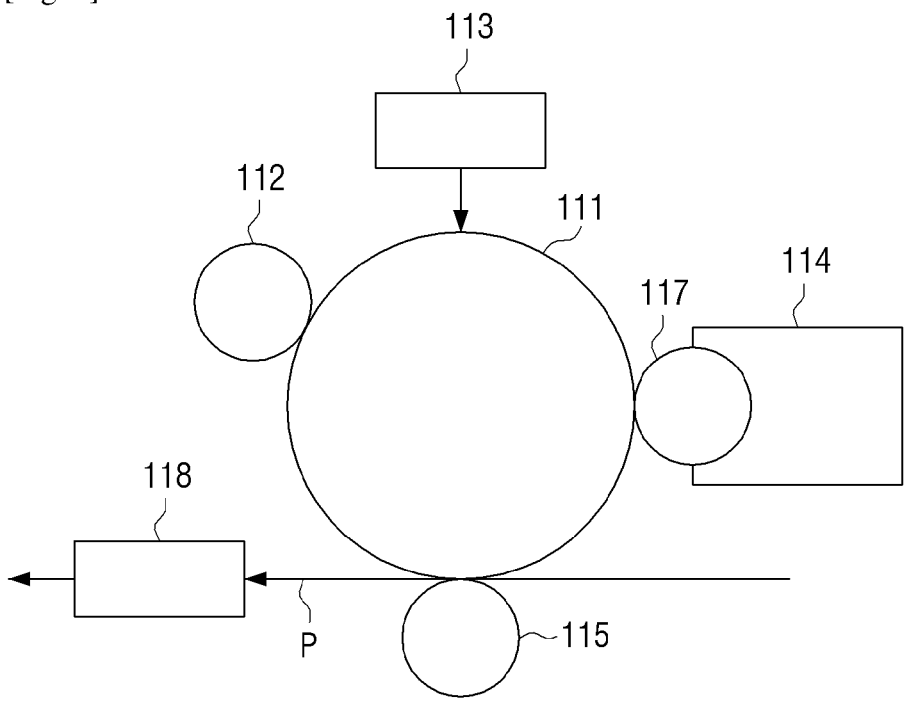

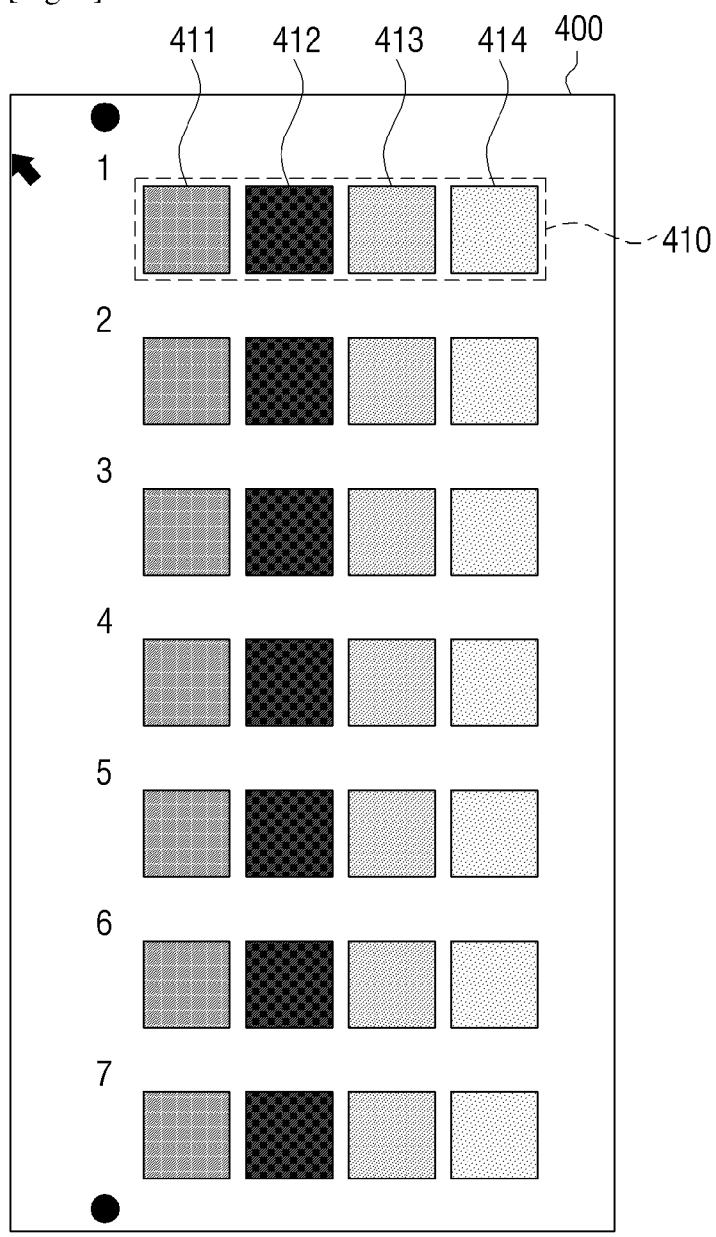
[Fig. 4]

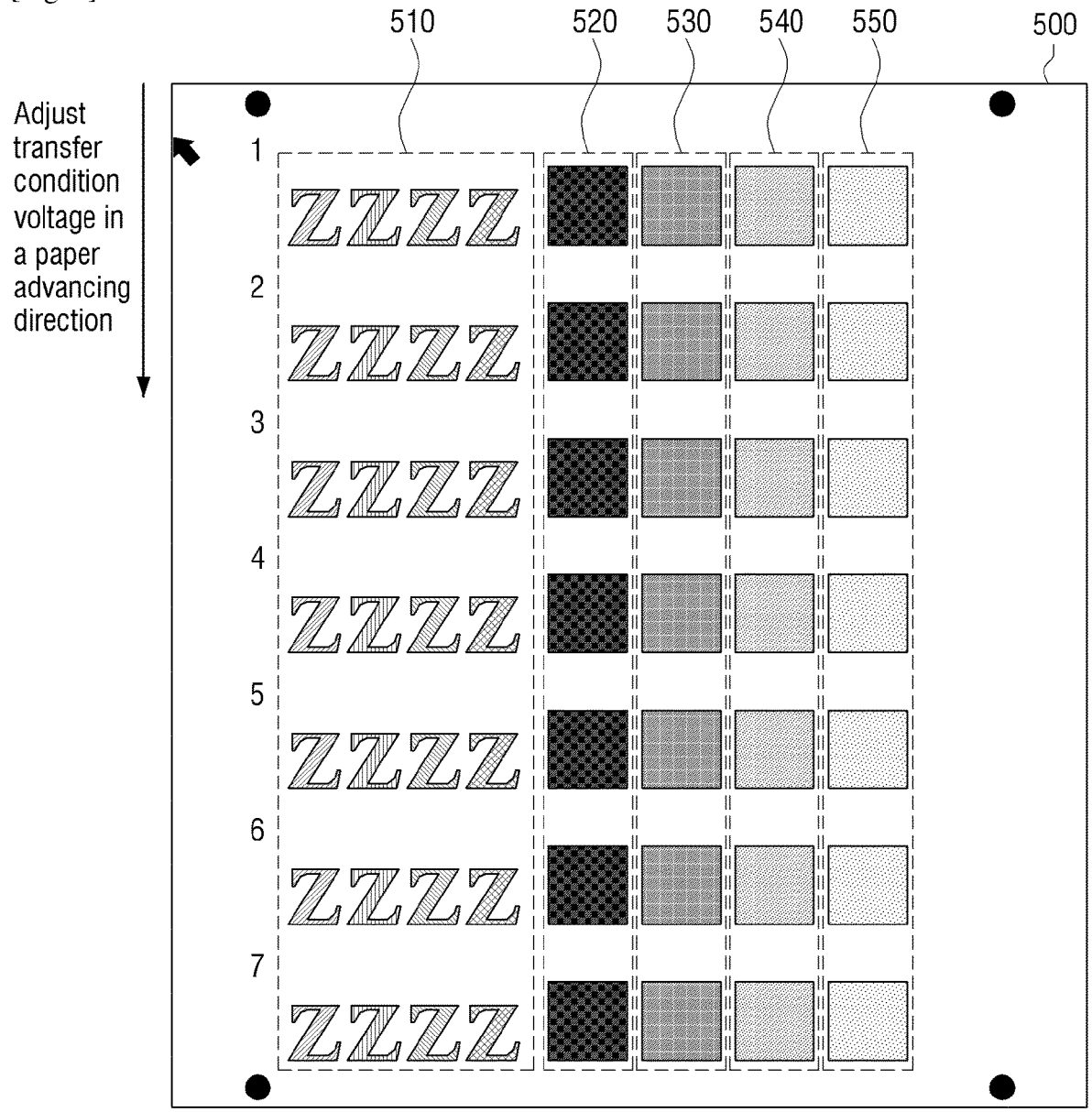

[Fig. 6]
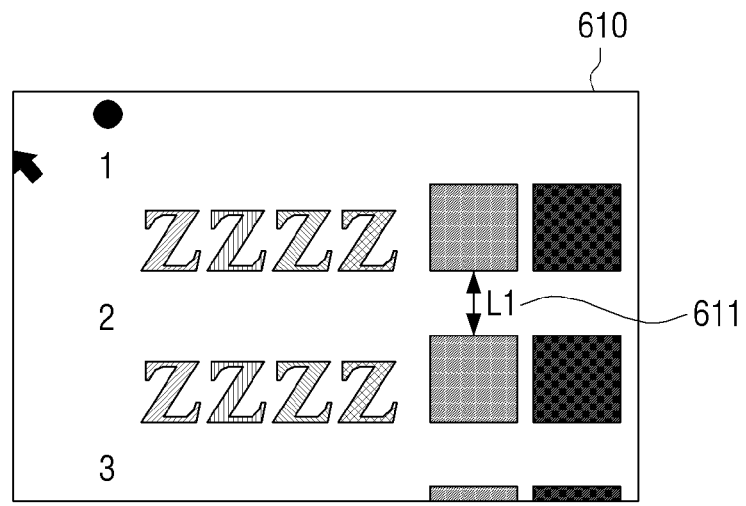
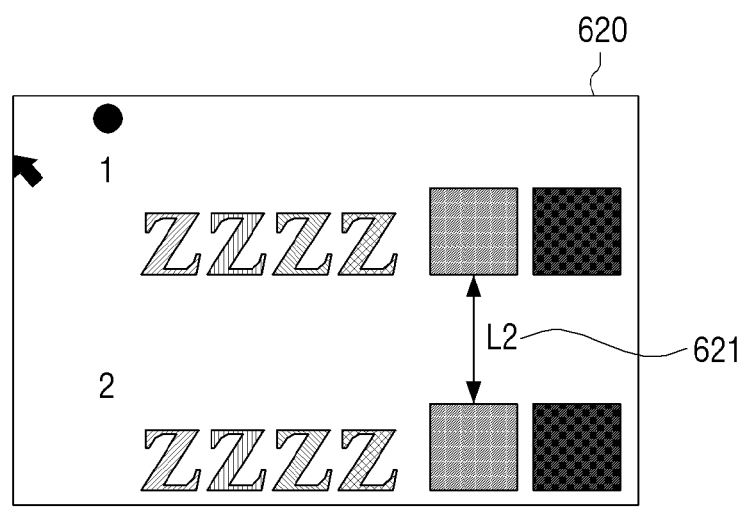
[Fig. 7]
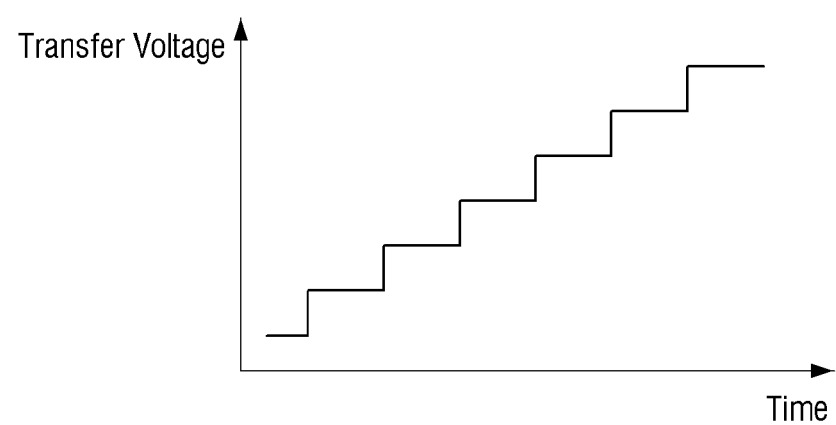

[Fig. 8]

| Defects | Descriptions | Examples |
|---|---|---|
| Blur | Blur defect occurs when a toner is released to the periphery since the adhesive force of the toner is reduced. This defect occurs mainly around overlapping color patterns like R, G, B. |  |
| White Spot | White spot defect occurs due to electric discharge generated at micropores when a sponge-type transfer roller is used. This defect occurs mainly in black of high-resistance paper. | 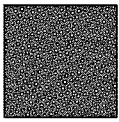 |
| Poor Transfer | Poor transfer defect appears in the form of picking when paper contains moisture in a high-temperature and humidity environment for a long time and a transfer current leaks. | 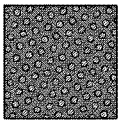 |
| Poor Transfer | Poor transfer may appear in the form of mottle due to the lack of an electric field for moving a toner when the toner is transferred by the electric field in a low-temperature and humidity environment. | 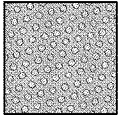 |
| Retransfer | Retransfer defect is a phenomenon in which electric discharge exceeding a transfer voltage is generated when an electric field is applied, and thus a toner is returned to the intermediate transfer belt. This defect occurs mainly in thick paper and bright color. | 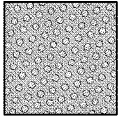 |

[Fig. 9]
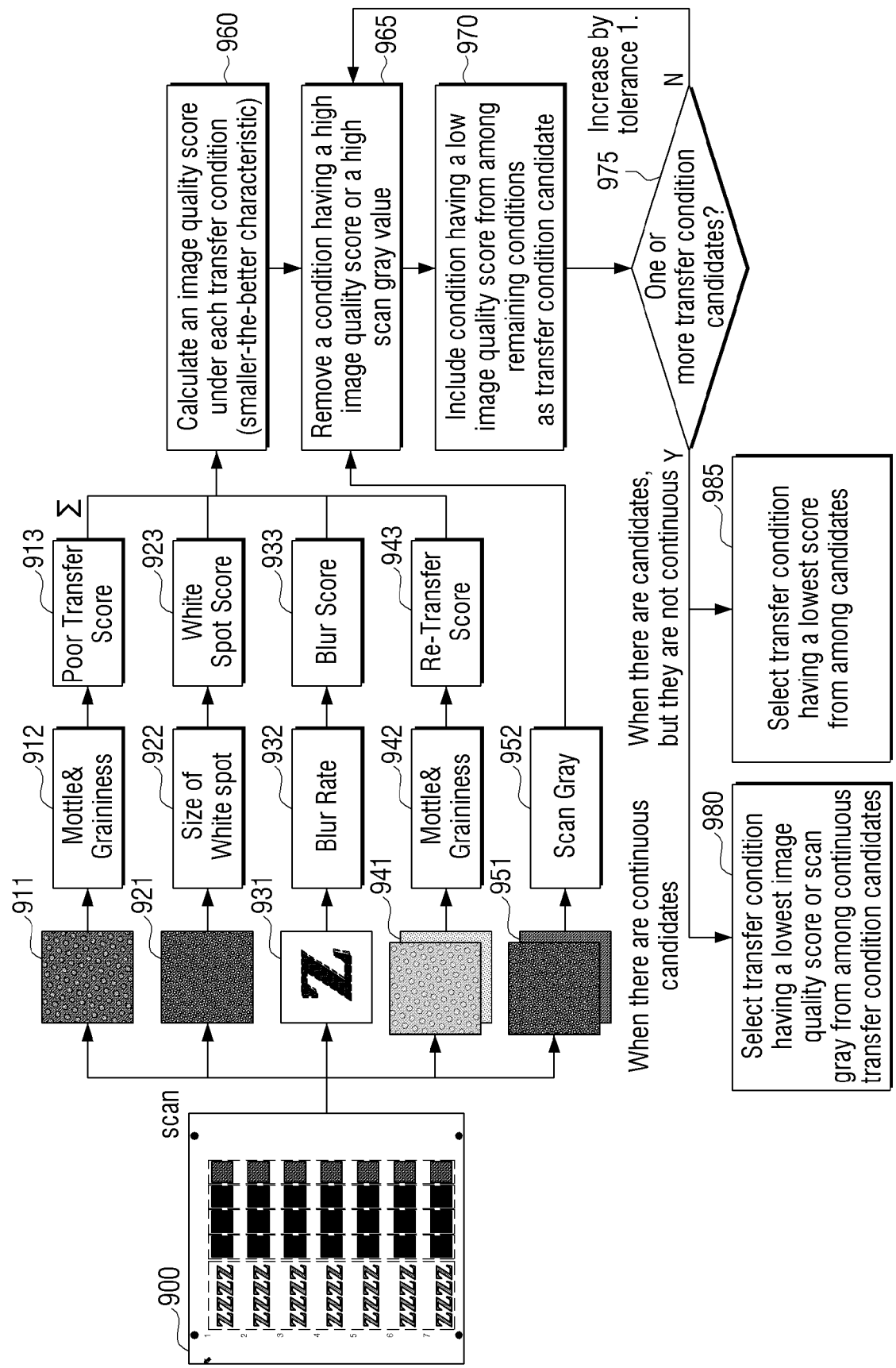

[Fig. 10]
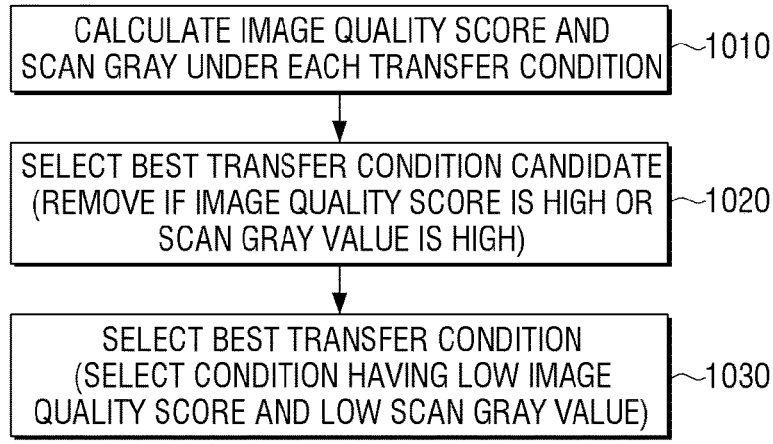
[Fig. 11]
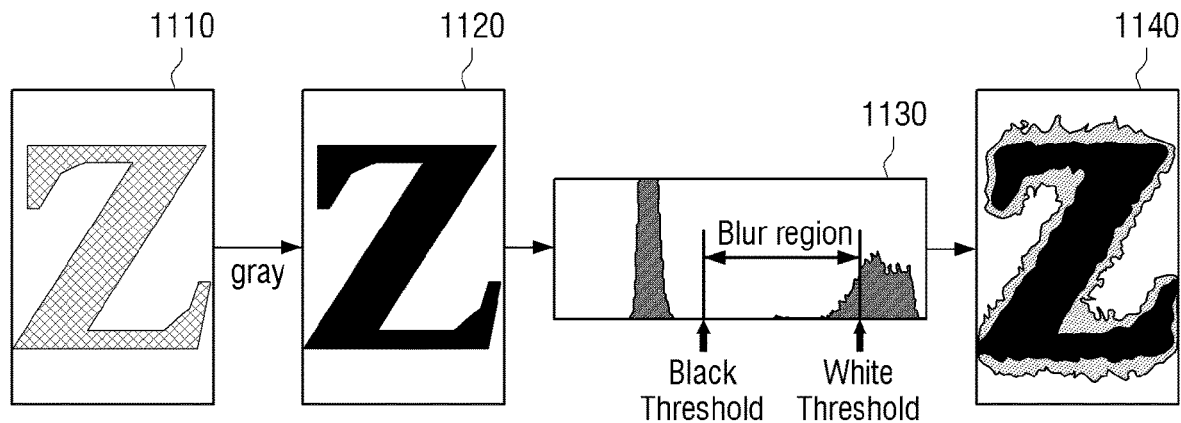
[Fig. 12]
| Blur Rate (%) | Score |
|---|---|
| 2.0 | 1.0 |
| 5.0 | 2.2 |
| 8.0 | 2.9 |
| 15.0 | 4.1 |
| 20.0 | 5.0 |

[Fig. 13]
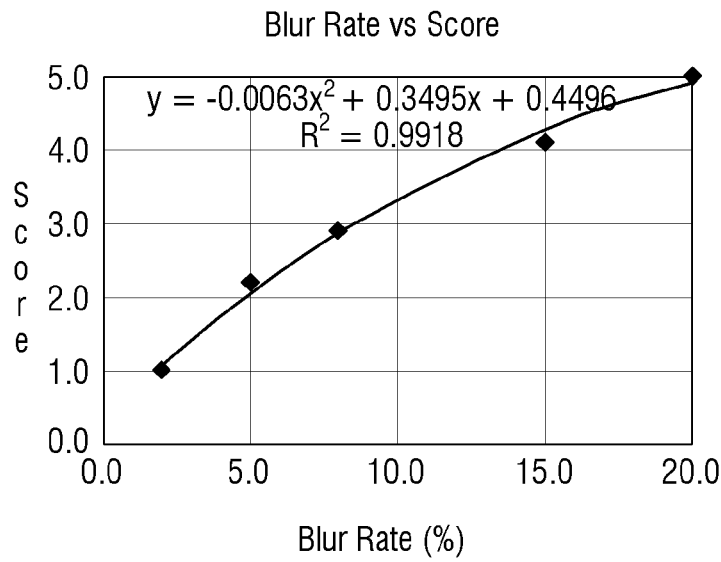
[Fig. 14]
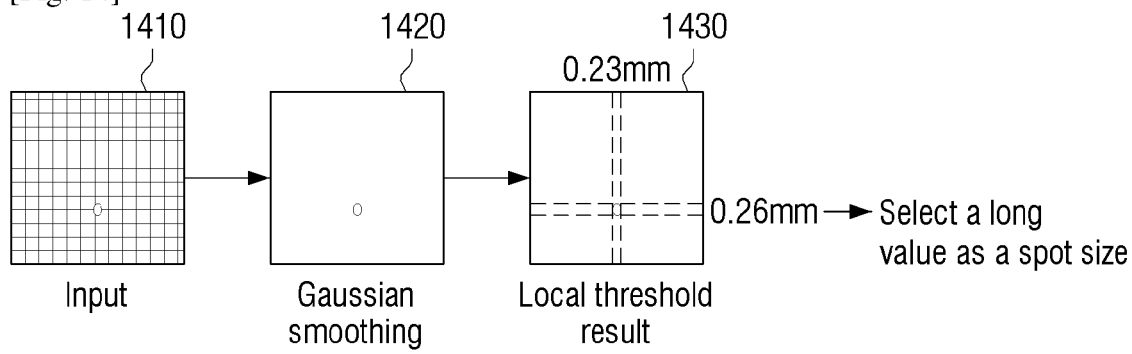
[Fig. 15]
| White Spot Size(mm) | Score |
|---|---|
| 3.0 | 1.0 |
| 10.0 | 2.5 |
| 17.0 | 3.2 |
| 25.0 | 4.3 |
| 33.0 | 5.0 |

[Fig. 16]
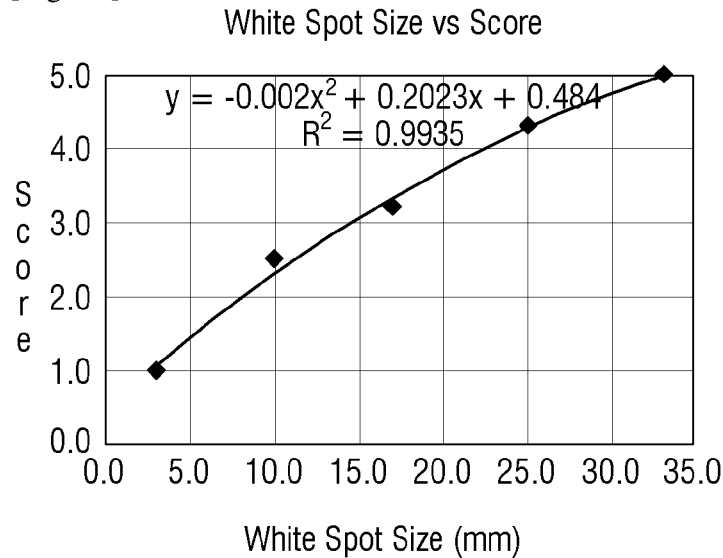
[Fig. 17]
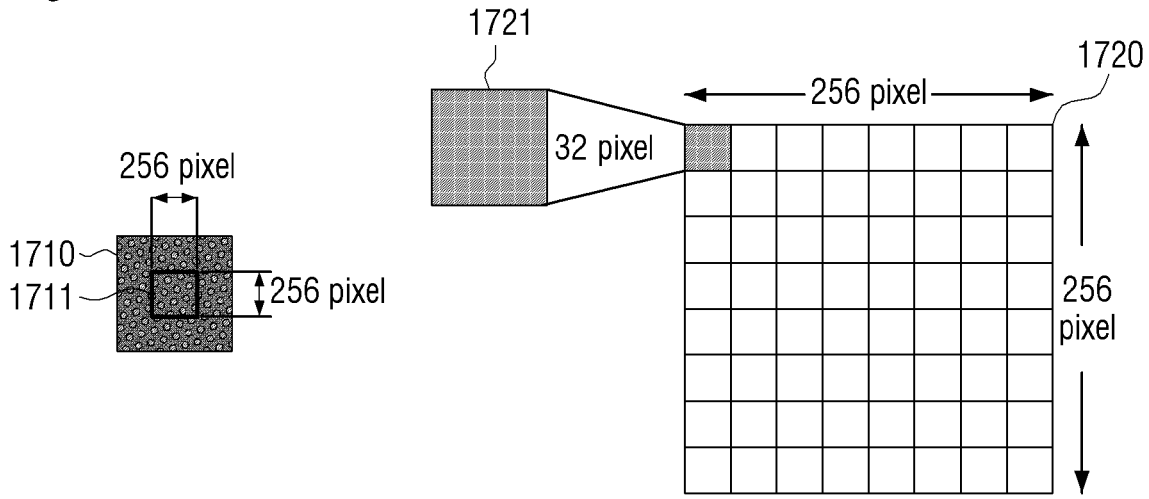
[Fig. 18]
| Poor Transfer | Score |
|---|---|
| 0.8 | 1.1 |
| 1.6 | 2.3 |
| 2.6 | 2.9 |
| 3.9 | 4.5 |
| 5.0 | 5.0 |

[Fig. 19]
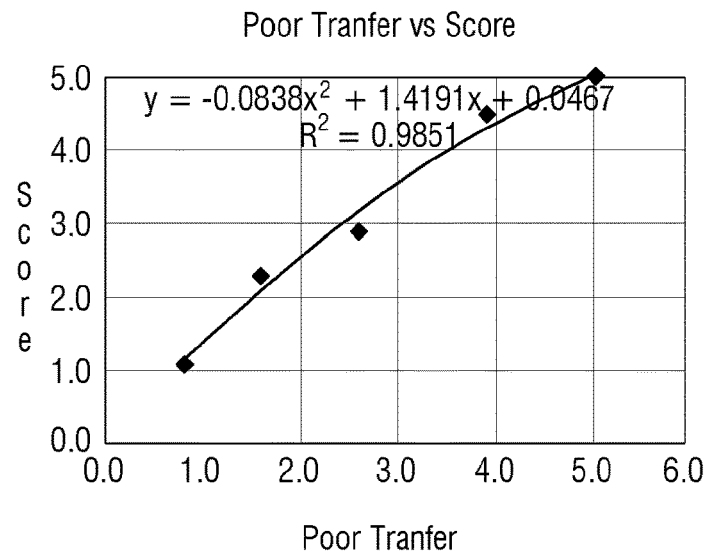
Poor Tranfer vs Score
[Fig. 20]
| Retransfer | Score |
|---|---|
| 2.8 | 1.2 |
| 3.3 | 1.8 |
| 3.8 | 2.8 |
| 4.6 | 3.6 |
| 5.8 | 5.0 |
[Fig. 21]
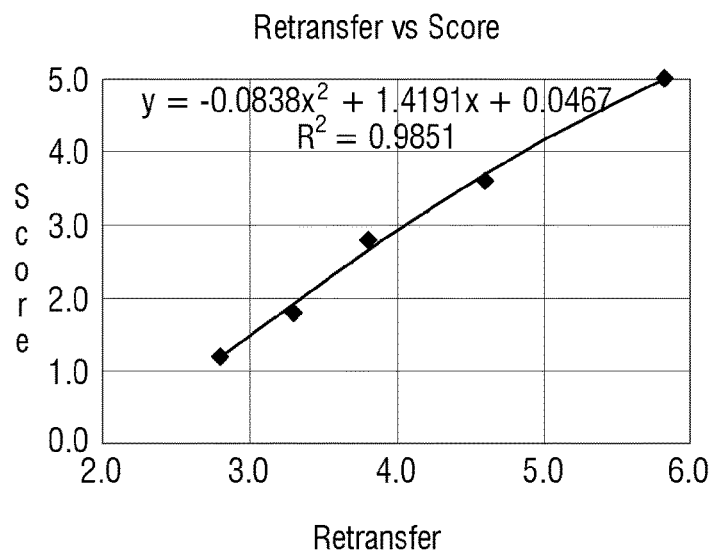
Retransfer vs Score

[Fig. 22]
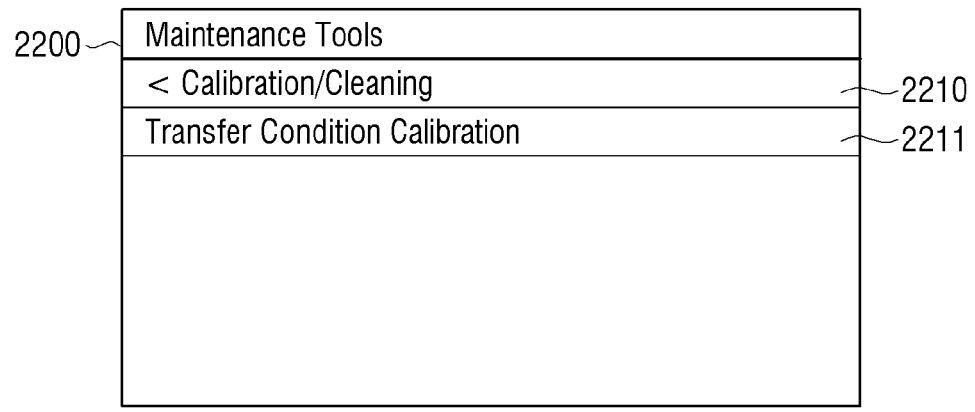
[Fig. 23]
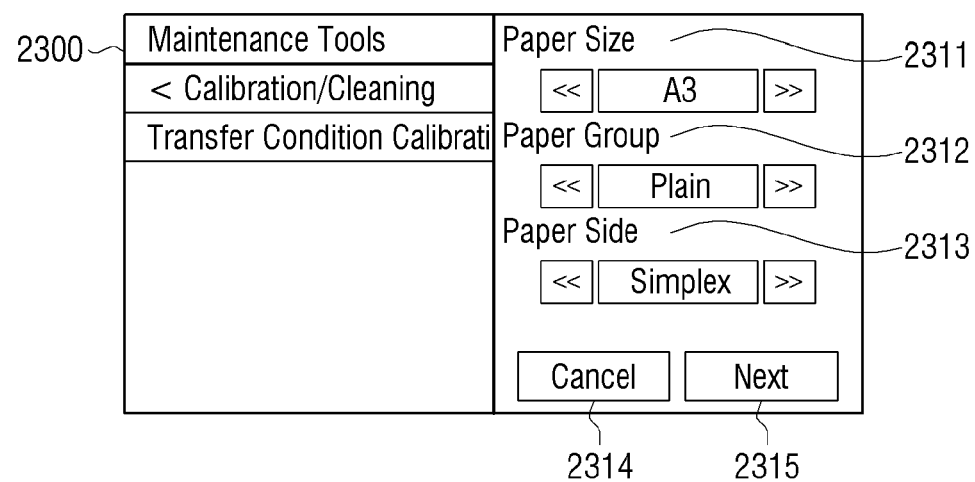
[Fig. 24]
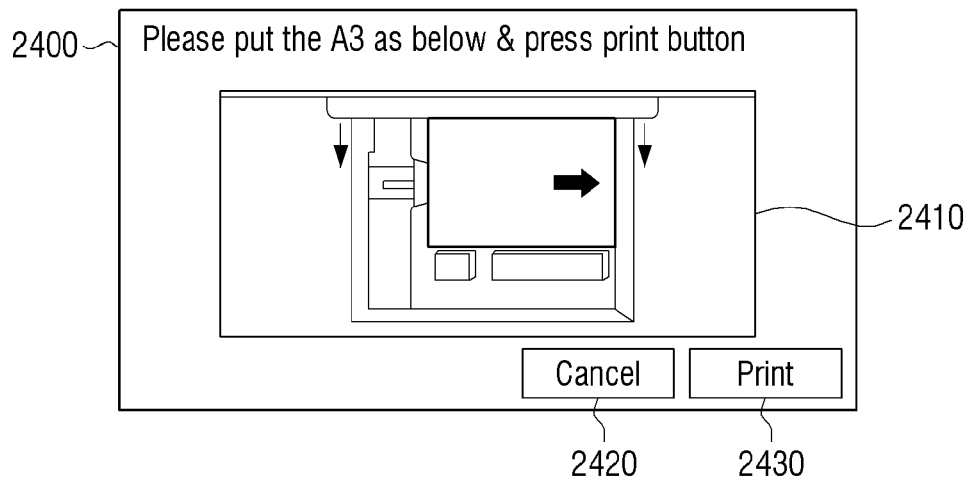

[Fig. 25]
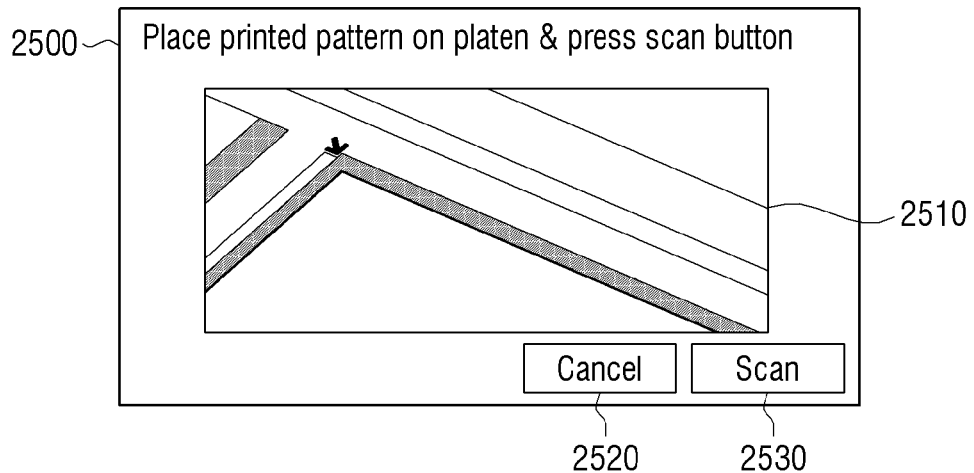
[Fig. 26]
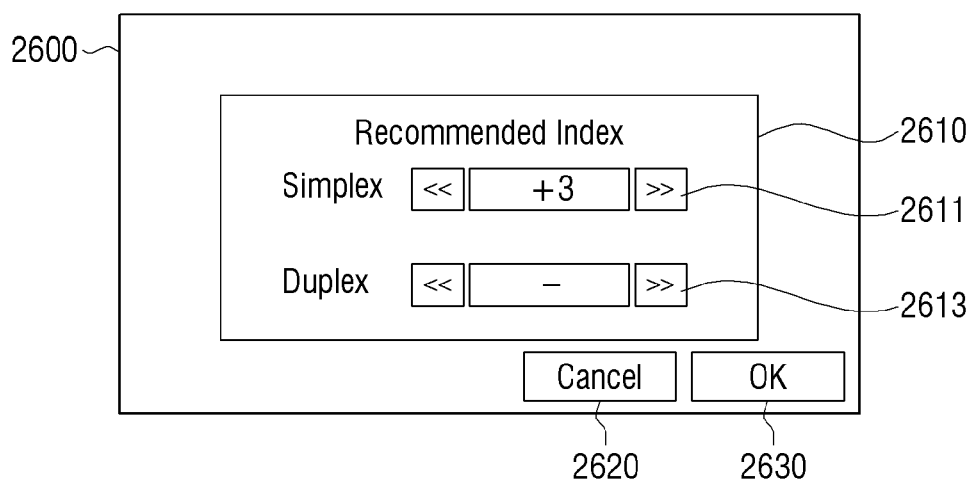
[Fig. 27]
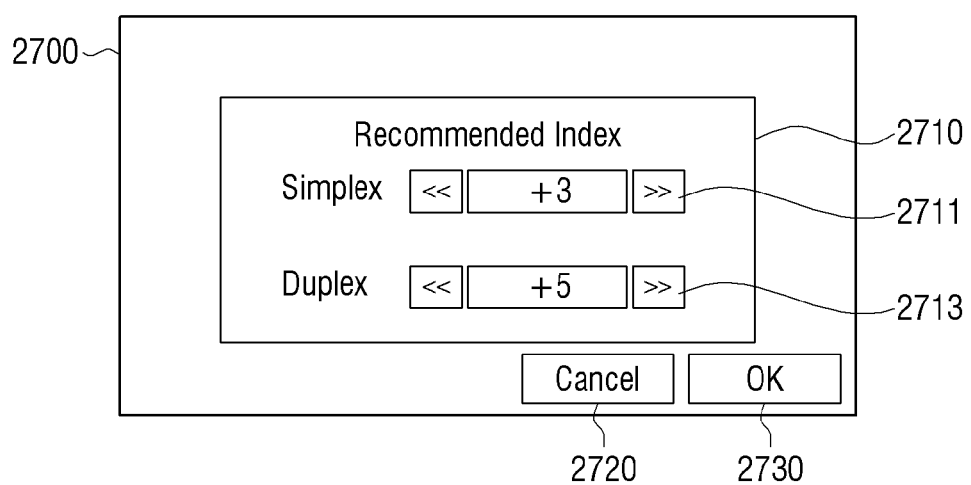

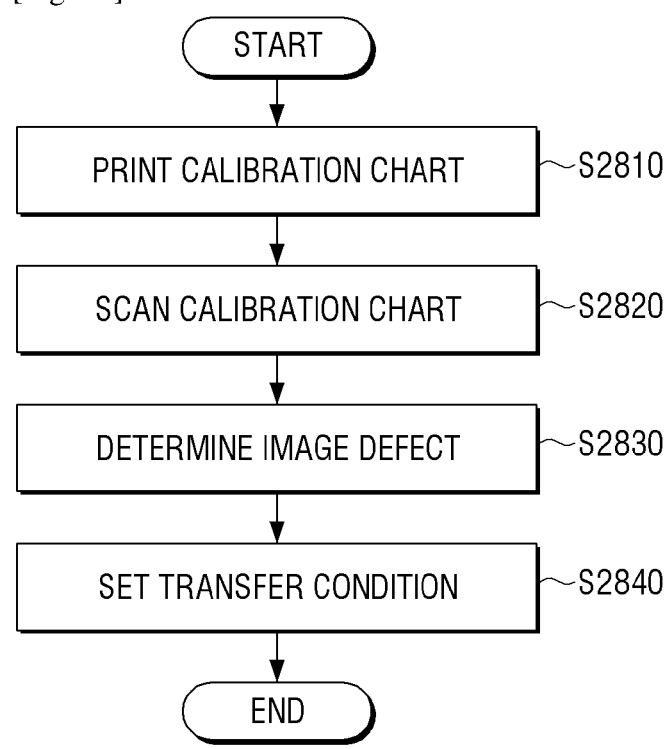
[Fig. 28]

CALIBRATION CHART BASED IMAGE FORMING APPARATUS

BACKGROUND ART

In general, an image forming apparatus refers to an apparatus that prints printing data generated at a printing control terminal apparatus such as a computer on recording paper. Examples of such an image forming apparatus are a copier, a printer, a scanner, a facsimile machine, or a multi-function peripheral (MFP) complexly implementing the functions of the aforementioned devices through a single device.

The image forming apparatus may form an image in various methods. From among these, electrophotography is increasingly used. The electrophotography refers to a method that forms an image through a process that includes charging a surface of a photoconductor, forming a latent image through laser scanning, developing by covering the latent image with toners, transferring the developed toner to printing paper, and fusing the toner.

DISCLOSURE OF INVENTION

Brief Description of Drawings

The present disclosure will be more apparent by describing certain examples with reference to the accompanying drawings, in which:

FIG. 1 is a block diagram illustrating a configuration of an image forming apparatus according to an example;

FIG. 2 is a block diagram illustrating a more detailed configuration of an image forming apparatus according to an example;

FIG. 3 is a configuration view of an image former, such as the image former of FIG. 1, according to an example;

FIG. 4 is a view illustrating a calibration chart according to an example;

FIG. 5 is a view illustrating a calibration chart according to an example;

FIG. 6 is a view illustrating a difference in arrangements in calibration charts corresponding to a transfer control method according to an example;

FIG. 7 is a view illustrating an operation of adjusting a voltage in a process of printing a calibration chart according to an example;

FIG. 8 is a view showing image defects related to a transfer error according to an example;

FIG. 9 is a view illustrating an operation of determining a transfer condition according to an example;

FIG. 10 is a view illustrating an operation of determining a final transfer condition when a plurality of transfer conditions are selected according to an example;

FIG. 11 is a view illustrating a method for evaluating a blur defect according to an example;

FIG. 12 is a view illustrating an evaluation score of a blur defect according to an example;

FIG. 13 is a view illustrating a relationship of an evaluation score to a blur rate using interpolation according to an example;

FIG. 14 is a view illustrating a method for evaluating a white spot defect according to an example;

FIG. 15 is a view illustrating an evaluation score of a white spot defect according to an example;

FIG. 16 is a view illustrating a relationship of an evaluation score to a size of a white spot using interpolation according to an example;

FIG. 17 is a view illustrating a method for evaluating a poor transfer defect and a retransfer defect according to an example;

FIG. 18 is a view illustrating an evaluation score of a poor transfer defect according to an example;

FIG. 19 is a view illustrating a relationship of an evaluation score to a poor transfer using interpolation according to an example;

FIG. 20 is a view showing an evaluation score of a retransfer defect according to an example;

FIG. 21 is a view illustrating a relationship of an evaluation score to a poor retransfer defect using interpolation according to an example;

FIGS. 22 to 27 are views illustrating various user interface windows which may be displayed on a display, such as the display of FIG. 2, according to an example; and FIG. 28 is a flowchart illustrating a method for setting a transfer condition according to an example.

MODE FOR THE INVENTION

Various examples, which may be implemented having different forms, will be described herein below with reference to the accompanying drawings. To describe features of examples more clearly, matters well-known to a person skilled in the art are not described in detail.

When an element is described as "connected with/to" another element, the element may be directly connected with/to another element, and there may be an intervening element between the element and another element. In addition, when an element is mentioned as "including" another element, it should be understood that the element may further include other elements unless specified otherwise.

An "image forming job" recited herein refers to various jobs related to images (for example, printing, copying, scanning, or faxing) such as forming an image or generating/storing/transmitting an image file, and the "job" recited herein refers to not only an image forming job but also a series of processes necessary for performing the image forming job.

In addition, an "image forming apparatus" recited herein refers to an apparatus which prints printing data generated at a terminal device, such as a computer, on a recording paper. Examples of the image forming apparatus may be a copier, a printer, a scanner, a facsimile machine, or an multi-function peripheral (MFP) complexly implementing the functions of the aforementioned devices through a single device. The image forming apparatus refers to all types of apparatuses which can perform the image forming job, such as a printer, a copier, a scanner, a facsimile machine, an MFP, or a display apparatus.

In addition, "hard copy" refers to an operation of outputting an image on a printing medium such as paper, and "soft copy" refers to an operation of outputting an image through a display apparatus such as a TV or a monitor.

In addition, a "content" refers to all kinds of data which are targets of the image forming job such as a photo, an image, a document file, and the like.

In addition, "printing data" refers to data which is converted to a printable format in a printer. When the printer supports direct printing, a file may be printing data.

In addition, a "user" is a person who performs operations related to the image forming job using an image forming apparatus or a device connected to the image forming apparatus in a wired or wireless manner. In addition, a "manager" may be a person who has the authority to access all functions of the image forming apparatus and a system. The "user" and the "manager" may be the same person.

FIG. 1 is a block diagram illustrating a configuration of an image forming apparatus according to an example.

Referring to FIG. 1, the image forming apparatus 100 may include an image former 110, a scanner 120, and a processor 130. Herein, the image forming apparatus 100 may be a copier, a printer, a scanner, a facsimile machine, or an MFP complexly implementing functions of the aforementioned devices through a single device.

The image former 110 may print printing data. For example, the image former 110 may print printing data received through a communication interface according to a predetermined transfer method and a transfer condition. The image former 110 may include a plurality of engines. For example, the plurality of engines may be cyan/magenta/yellow/black (C/M/Y/K) engines. Herein, the engine is configured to perform laser scanning/charging/transferring with respect to one color and to form an image corresponding to a specific pattern or the corresponding color on an intermediate transfer belt or document. The engine may adopt an ink jet method in addition to a laser printer method.

The image former 110 may determine a transfer method and may operate according to the determined transfer method. For example, the image former 110 may perform the transferring operation according to any one of a voltage control method or a current control method. Herein, the voltage control method is a method that controls a transfer device to have a predetermined transfer voltage during the transferring operation, and the current control method is a method that controls the transfer device to have a predetermined transfer current during the transferring operation.

The transfer method may be determined according to an environment in which the image forming apparatus 100 is placed, a printing paper, and the like. For example, when the image forming apparatus 100 outputs normal paper in a normal environment, the image forming apparatus 100 may determine to perform the transferring operation according to the current control method, and, when the image forming apparatus 100 outputs normal paper in a high temperature and humidity environment, the image forming apparatus 100 may determine to perform the transferring operation according to the voltage control method.

In addition, the image former 110 may determine a transfer condition. For example, the image former 110 may determine the transfer condition using a lookup table, which has transfer conditions (for example, voltage values or current values) corresponding to environments in which the image forming apparatus 100 is placed, corresponding to a printing paper, and the like. In the above-described example, the transfer method and the transfer condition are independently determined, but in practice, they may be determined all together.

In addition, the image former 110 may print a calibration chart. For example, the image former 110 may print the calibration chart in which different color patches are arranged in a main scanning direction, and rows of different color patches are repeatedly arranged in a sub scanning direction. A calibration chart according to an example will be described below with reference to FIGS. 4 and 5.

The image former 110 may change a transfer condition while printing the calibration chart and may change the transfer condition on the basis of a patch in the calibration chart. For example, when the image former 110 performs the transferring operation in the voltage control method, the image former 110 may change the transfer condition by gradually increasing the level of the voltage on the patch basis, or may change the transfer condition by gradually reducing the level of the voltage on the patch basis.

The scanner 120 may scan the printed calibration chart. For example, the scanner 120 may include a lens for focusing light reflected from a document onto an image sensor provided therein, and may read out image information of the document from the light focused onto the image sensor. The scanner 120 may be positioned on a flatbed or within a duplex automatic document feeder (DADF).

In an example, the scanner 120 provided in the image forming apparatus 100 directly scans the calibration chart and uses the same. However, the calibration chart may be scanned by an external scanning device and the scanned calibration chart may be received from the external scanning device through a communication interface.

The processor 130 may control respective elements in the image forming apparatus 100. For example, in response to a copy command being received from a user, the processor 130 may control the scanner 120 to scan a document, and may control the image former 110 to print the document scanned by the scanner 120. In this case, the processor 130 may control the image former 110 to perform a transferring operation according to a transfer method and a transfer condition, which are predetermined according to a currently loaded document and an environment.

Herein, the predetermined transfer method and transfer condition may be differently set according to a type of printing paper. Accordingly, the processor 130 may determine the transfer method and the transfer condition to be applied based on the type of paper currently loaded in a loading box (e.g., paper tray), and may control the image former 110 to perform the transferring operation based on the transfer method and the transfer condition.

In response to printing data being received from an external device, the processor 130 may control the image former 110 to print the received printing data. In addition, in response to a scan command being received from the user, the processor 130 may control the scanner 120 to scan a document, and to transmit a scanned image to a device designated by the user.

In response to a transfer calibration command being received from the user, the processor 130 may control the image former 110 to print a calibration chart. For example, the processor 130 may determine the transfer method based on the currently loaded printing paper, and may control the image former 110 to print a calibration chart corresponding to the transfer method.

For example, in response to the determined transfer method being the voltage control method, the processor 130 may control the image former 110 to print a calibration chart in which a gap between patches is a predetermined first gap. In this case, the processor 130 may control the image former 110 to increase or reduce a transfer voltage according to the predetermined first gap.

Alternatively, in response to the determined transfer method being the current control method, the processor 130 may control the image former 110 to print a calibration chart in which a gap between patches is a second gap wider than the predetermined first gap. In this case, the processor 130 may control the image former 110 to increase or reduce a transfer current according to the predetermined second gap.

The above-described calibration chart may be pre-stored in the image forming apparatus 100 in the form of an image, and, in response to a transfer calibration command being inputted by the user, a calibration chart may be generated based on the transfer method and color values constituting the calibration chart, and may be used.

In response to the calibration chart being printed, the processor 130 may control the display 150 to display guide information for scanning the printed calibration chart. Herein, the guide information is information for asking the user to place the printed paper on the scanner, or information on a method thereof.

In response to a scan command on the calibration chart being inputted by the user, the processor 130 may control the scanner 120 to scan the printed calibration chart.

In addition, the processor 130 may determine an image defect under each transfer condition using the scanned calibration chart, and may set a transfer condition of the image former 110 based on the determined image defect.

For example, the processor 130 may determine an image defect such as a blur defect, a white spot defect, a poor transfer defect, a retransfer defect, or the like using color patches in the scanned calibration chart.

The processor 130 may calculate a blur rate under each transfer condition using the color patches in the scanned calibration chart. For example, the processor 130 may generate a ternary patch image for each transfer condition using a red patch, a green patch, and a blue patch in the scanned calibration chart, and may calculate a blur rate under each transfer condition using the generated ternary patch image. An operation of calculating the blur rate will be described below with reference to FIG. 11.

In addition, the processor 130 may determine a blur defect based on the calculated blur rate. Alternatively, the processor 130 may calculate a blur score corresponding to the calculated blur rate.

In addition, the processor 130 may detect a spot existing within a black patch using the black patch in the scanned calibration chart, and may calculate a size of the spot under each transfer condition. An operation of calculating the size of the spot will be described below with reference to FIG. 14.

In addition, the processor 130 may determine a white spot defect under each transfer condition according to the calculated size of the spot. Alternatively, the processor 130 may calculate a blur score corresponding to the calculated size of the spot.

In addition, the processor 130 may divide the blue patch in the scanned calibration chart into a plurality of blocks, and may calculate a color average and a color standard deviation regarding each of the divided plurality of blocks. A method for calculating the color average and the color standard deviation will be described below with reference to FIG. 17.

In addition, the processor 130 may calculate a poor transfer value under each transfer condition based on the calculated color average and standard deviation. Alternatively, the processor 130 may determine a poor transfer defect based on the calculated color average and standard deviation.

In addition, the processor 130 may divide each of the black patch and the cyan patch in the scanned calibration chart into a plurality of blocks, and may calculate a color average and a color standard deviation regarding each of the divided plurality of blocks. A method for calculating the color average and the color standard deviation will be described below with reference to FIG. 17.

In addition, the processor 130 may calculate a retransfer value under each transfer condition based on the calculated color average and standard deviation. Alternatively, the processor 130 may determine a retransfer defect based on the calculated color average and standard deviation.

In addition, the processor 130 may set a transfer condition based on the presence/absence of an image defect or based on each of the calculated scores. For example, the processor 130 may determine a final transfer condition by excluding a transfer condition in which an image defect is detected from among the plurality of transfer conditions.

When there are a plurality of transfer conditions in which an image defect is not detected, or there are no such transfer conditions, the processor 130 may determine a final transfer condition based on a sum of the calculated scores. In this case, the processor 130 may assign a predetermined weight value to each of the image defects and calculate an image quality score under each transfer condition, and may determine a transfer condition based on the calculated image quality score. In this process, the processor 130 may exclude a transfer condition that has a value falling within a predetermined range from among the determined image defects, and may determine a transfer condition from among the other transfer conditions based on the calculated image quality score.

In FIG. 1, the image forming apparatus 100 directly scans the printed calibration chart, but in practice, the image forming apparatus 100 may not include the scanner and may receive a calibration chart scanned by another image read-out device and may use the same. In addition, the calibration chart may be used in a capturing method rather than the scanning method. For example, the printed calibration chart may be captured by a camera of a mobile device, which will be described below, and the captured scan image may be received and used.

An example configuration of the image forming apparatus has been described, but the image forming apparatus may further include various configurations in practice. This will be described below with reference to FIG. 2.

FIG. 2 is a block diagram illustrating a more detailed configuration of an image forming apparatus according to an example.

Referring to FIG. 2, the image forming apparatus 100 may include the image former 110, the scanner 120, the processor 130, a communication interface 140, a display 150, an operation inputter 160, and a storage 170. Herein, the image forming apparatus 100 may be a copier, a printer, a scanner, a facsimile machine, or an MFP complexly implementing the functions of the aforementioned devices through a single device.

The image former 110, the scanner 120, and the processor 130 perform the same functions as those of FIG. 1 and a redundant explanation thereof is omitted.

The communication interface 140 may be connected with a printing control terminal device (not shown) and may receive printing data from the printing control terminal device. —For example, the communication interface 140 may be configured to connect the image forming apparatus 100 to an external device, and may connect to a terminal device through a short range communication network (e.g., a local area network (LAN)) and the Internet. The communication interface 140 also may connect to a terminal device through a universal serial bus (USB) port or a wireless communication (e.g., Wi-Fi 802.11a/b/g/n, near field communication (NFC), Bluetooth, etc.) port. Herein, the printing control terminal device may be a personal computer (PC) or a notebook PC, or may be a mobile device such as a smart phone.

In addition, the communication interface 140 may receive data (e.g., a scan image on a calibration chart) scanned by an external image read-out device or a mobile device.

The display 150 may display a variety of information provided by the image forming apparatus 100. For example, the display 150 may display an operation state of the image forming apparatus 100, or may display a user interface window for selecting a function, an option, and the like, which are selectable by a user. The display 150 may be a monitor such as a light emitting diode (LED), a liquid crystal display (LCD), a cathode ray tube (CRT), or the like, and may be implemented by using a touch screen to perform the function of the operation inputter 160, which will be described below, simultaneously.

In addition, the display 150 may display a user interface window for receiving a transfer calibration command. In addition, the display 150 may display a user interface window displaying guide information for scanning a printed calibration chart. Various user interface windows which are displayed by the display 150 will be described below with reference to FIGS. 22 to 27.

The operation inputter 160 may include a plurality of function keys through which the user sets or selects various functions supported by the image forming apparatus 100. The operation inputter 160 may be implemented by using a device such as a mouse, a keyboard, or the like, and may be implemented by using a touch screen to perform the function of the above-described display 150 simultaneously. Through the operation inputter 160, the user may input various control commands regarding the image forming apparatus 100. For example, the user may input a transfer calibration command for correcting a transfer condition of the image forming apparatus 100 using the operation inputter 160.

When the image forming apparatus 100 has a plurality of paper loading boxes, the operation inputter 160 may receive a selection of a paper loading box (i.e., a paper tray) to be used for a printing job. Alternatively, the operation inputter 160 may receive a variety of information related to printing paper to be used for the printing job. Herein, the variety of information related to the printing paper may be a paper size, information on whether paper is coated, thickness information, or the like.

The storage 170 may store printing data. For example, the storage 170 may store printing data which is received through the above-described communication interface 140. The storage 170 may be implemented by using an external storage medium, a removable disk including a USB memory, a web server through a network, or the like, in addition to a storage medium in the image forming apparatus 100.

The storage 170 may store information on a transfer method and a transfer condition corresponding to printing paper and an environment. In addition, the storage 170 may store data or an image regarding a calibration chart.

In addition, the storage 170 may store a scanned scan image.

As described above, the image forming apparatus 100 may determine an image defect under each transfer condition, may set a transfer condition according to the determined image defect, and may perform a printing job with best image quality without an image defect.

FIG. 3 is a configuration view of an image former, such as the image former of FIG. 1, according to an example.

Referring to FIG. 3, the image former 110 may include a photoconductive drum 111, a charging device 112, a laser scanning device 113, a developing device 114, a transfer device 115, and a fusing device 118.

The image former 110 may further include a paper feeding means (not shown) for supplying a recording medium P. An electrostatic latent image may be formed on the photoconductive drum 111. The photoconductive drum 111 may be referred to as a photoconductive drum or a photoconductive belt according to its shape.

Hereinafter, only the configuration of the image former 110 corresponding to one color will be described by way of an example for convenience of explanation. However, in practice, the image former 110 may include a plurality of photoconductive drums 111 corresponding to a plurality of colors, a plurality of charging devices 112, a plurality of laser scanning devices 113, a plurality of developing devices 114, and an intermediate transfer belt.

The charging device 112 may charge a surface of the photoconductive drum 111 with a uniform electric potential. The charging device 112 may be implemented by using a corona charging device, a charging roller, a charging brush, or the like.

The laser scanning device 113 may form an electrostatic latent image on the surface of the photoconductive drum 111 by changing the electric potential on the surface of the photoconductive drum 111 according to image information to be printed. For example, the laser scanning device 113 may form the electrostatic latent image by radiating modulated light onto the photoconductive drum 111 according to the image information to be printed. The laser scanning device 113 configured as described above may be referred to as a light scanning device, and an LED may be used as a light source.

The developing device 114 may contain a developer, and may develop the electrostatic latent image into a visible image by supplying the developer to the electrostatic latent image. The developing device 114 may include a developing roller 117 to supply the developer to the electrostatic latent image. For example, the developer may be supplied from the developing roller 117 to the electrostatic latent image formed on the photoconductive drum 111 by a developing electric field formed between the developing roller 137 and the photoconductive drum 111.

The visible image formed on the photoconductive drum 111 may be transferred to the recording medium P by the transfer device 115 or the intermediate transfer belt (not shown). The transfer device 115 may transfer the visible image to the recording medium according to an electrostatic transfer method. The visible image may be attached to the recording medium P by electrostatic attraction.

The above-described transfer method and transfer condition are a method and a condition when an image is transferred to the recording medium, and, when the image forming apparatus 100 uses the intermediate transfer belt, the transfer method and the transfer condition described above with reference to FIGS. 1 and 2 may be applied to the process of transferring an image formed on the intermediate transfer belt to the recording medium.

For example, when the intermediate transfer belt is used, the image formed on the photoconductive drum 111 may be primarily transferred to the intermedia transfer belt. The image transferred to the intermediate transfer belt may be secondarily transferred to the recording medium. The primary transfer operation may be performed regardless of a type of printing paper, and a transfer condition may be changed only in response to an environment in which the image forming apparatus 100 is placed. The secondary transfer operation may be changed according to a type of paper, and may be performed according to a transfer method and a transfer condition corresponding to the printing paper through the process described above with reference to FIGS. 1 and 2.

The fusing device 118 may fuse the visible image onto the recording medium P by applying heat and/or pressure to the visible image on the recording medium P. The printing job may be completed through the above-described series of processes.

The above-described developer may be used every time that an image forming job is performed and may be exhausted when it is used for longer than a predetermined time. In this case, a unit storing the developer (for example, the above-described developing device 114) should be replaced with new one. Components or elements that can be replaced while the image forming apparatus 100 is used may be referred to as a consumable unit or a replaceable unit. A memory (or a customer replaceable unit monitor (CRUM) chip) may be attached to the consumable unit to manage the corresponding consumable unit appropriately.

FIG. 4 is a view illustrating an example of a calibration chart according to an example.

Referring to FIG. 4, the calibration chart 400 may have different color patches 411, 412, 413, and 414 arranged in a main scanning direction. In addition, the same row 410 of different color patches 411, 412, 413, and 414 is repeatedly arranged in a sub scanning direction. In the illustrated example, only seven patch rows are illustrated, but in practice, six or less or eight or more patch rows may be arranged. Herein, the main scanning direction refers to a scanning direction of a laser scanning unit (LSU), and the sub scanning direction refers to a direction perpendicular to the main scanning direction, that is, a moving direction of printing paper.

In addition, although it is illustrated that four patches are arranged in one row, three or less or five or more patches may be arranged in practice. The configuration of patches in the row may be changed according to a type of an image defect to be detected.

For example, FIG. 4 illustrates a patch configuration for detecting a blur defect.

For example, the first patch 411 may be a patch having red, the second patch 412 may be a patch having green, the third patch 413 may be a patch having blue, and the fourth patch 414 may be a patch having black using all of cyan, magenta, yellow (CMY) toners.

In the illustrated example, each of the patches has a rectangular shape, but in practice, may be configured by a text and may have predetermined other shapes.

FIG. 5 is a view illustrating a calibration chart according to an example.

Referring to FIG. 5, the calibration chart 500 may include a first patch region 510, a second patch region 520, a third patch region 530, a fourth patch region 540, and a fifth patch region 550. In the example of FIG. 5, the calibration chart 500 may be used for detecting any of a blur defect, a white spot defect, a poor transfer defect, and a retransfer defect.

The first patch region 510 is a patch region for detecting the blur defect and performs the same function as that of the first to fourth patches of FIG. 4. For example, the first patch region 510 may have rows of patches of red, green, blue, and black using CMY toners repeatedly arranged in the sub scanning direction and having a high concentration (for example, 100%). In detecting the blur defect, only red, green, blue, and CMY-mixed black are used in the above-described example, but this is because the blur defect frequently occurs in these colors. However, in practice, other colors may be additionally used or only some colors may be used.

The second patch region 520 is a patch region for detecting the white spot and may have black patches using a black toner, having a high concentration (for example, 100%), and repeatedly arranged in the sub scanning direction. In detecting the white spot, only the black toner is used in the above-described example. This is because the white spot defect frequently occurs in this color, but, in practice, other colors may be additionally used.

The third patch region 530 is a patch region for detecting the poor transfer defect and may have high-concentration (for example, 100%) blue patches using cyan and magenta and repeatedly arranged in the sub scanning direction. In detecting the poor transfer, only blue is used in the above-described example. This is because the poor transfer defect frequently occurs in this color, but, in practice, other colors may be additionally used.

The fourth patch region 540 is a patch region for detecting the retransfer defect, and may have black patches using a black toner and cyan patches. The black and cyan patches are repeatedly arranged in the sub scanning direction and have a low concentration (for example, 20%). In detecting the retransfer defect, only black and cyan are used in the above-described example. This is because the retransfer defect frequently occurs in these colors, but, in practice, other colors may be additionally used or only some colors may be used. In addition, the low concentration is 20% in the above-described example, but this is merely an example of a numerical value and may be changed according to a type of a product.

The fifth patch region 550 is a patch region for detecting a scan gray or density and may have black patches using a black toner and/or blue patches using cyan and magenta toner. The black and/or blue patches may have a high concentration (for example, 100%) and be repeatedly arranged in the sub scanning direction.

FIG. 6 is a view illustrating a difference in arrangements in calibration charts corresponding to a transfer control method according to an example.

Referring to FIG. 6, a first calibration chart 610 is an example of a calibration chart when a voltage control method is used, and a second calibration chart 620 is an example of a calibration chart when a current control method is used. For example, the first calibration chart 610 and the second calibration chart 620 have the same configuration of color patches, but have a difference in a gap 611, 621 between patches in the sub scanning direction.

For example, the image forming apparatus 100 may operate in the voltage control method or the current control method, selectively, according to a type of printing paper in the same apparatus.

When the image forming apparatus 100 is controlled in the current control method, a rising time is required to reach an actually applied current and there is a falling time after the current is applied. Therefore, a delay time increases in comparison to the voltage control method.

In particular, in a normal printing process, one current value has only to be maintained, but the current value should be changed on a patch basis during the printing of the calibration chart. Therefore, when the calibration chart is printed in the current control method, the calibration chart in which the gap 621 between the patches is wider than that in the voltage control method as shown in FIG. 6 may be used.

FIG. 7 is a view illustrating an operation of adjusting a voltage in a process of printing a calibration chart according to an example.

Referring to FIG. 7, when the calibration chart is printed in the voltage control method, a transfer voltage may increase in phases. For example, when a calibration chart having seven rows is printed, a transfer voltage that is lower than a reference transfer voltage by three levels of a predetermined voltage unit may be applied at first, and the voltage may gradually increase by the predetermined voltage unit.

FIG. 7 depicts that the voltage gradually increases, but in practice, the voltage may gradually decrease. In addition, the number of change phases or steps may be divided into more phases or less phases according to the number of calibration charts.

FIG. 8 is a view showing image defects related to a transfer error according to an example.

Referring to FIG. 8, there may be roughly four types of image defects that may be caused by an error in a transfer process. The four types of image defects may include a blur defect, a white spot defect, a poor transfer defect, and a retransfer defect.

The blur defect may occur when a toner is released to a periphery of an intended area since the adhesive force of the toner is reduced, and may occur mainly when toners of different colors such as red, green, blue, or the like overlap one another. Considering this point, the blur defect may be detected using the red, green, blue, and black patches in which toners of different colors are combined, as described in FIGS. 4 and 5. An example operation of detecting the blur defect using the corresponding patches will be described below with reference to FIGS. 11 to 13.

The white spot defect may occur due to an electric discharge generated at micropores when a sponge-type transfer roller is used, and may occur mainly in black of high-resistance paper. Considering this point, the white spot defect may be detected using the black patch using the black toner as described in FIG. 4. An example operation of detecting the white spot defect using the corresponding patch will be described below with reference to FIGS. 14 to 16.

The poor transfer defect may appear in the form of picking or graininess when paper contains moisture in a high-temperature and humidity environment for a long time and a transfer current leaks, or may appear in the form of mottle due to the lack of an electric field for moving a toner when the toner is transferred by the electric field in a low-temperature and humidity environment. Accordingly, the poor transfer defect may be detected using the blue patch as described in FIG. 5. An example operation of detecting the poor transfer defect using the corresponding patch will be described below with reference to FIGS. 17 to 19.

The retransfer defect is a phenomenon in which electric discharge exceeding a transfer voltage is generated when an electric field is applied and thus a toner is returned to the intermediate transfer belt, and may occur mainly in thick paper and bright color. Considering this point, the retransfer defect may be detected using a patch of a low concentration as shown in FIG. 5. An example operation of detecting the retransfer defect using the corresponding patches will be described below with reference to FIGS. 20 and 21.

Based on the above explanations, examples of colors of image patches may be represented as shown in Table 1 presented below:

TABLE 1

| Poor Transfer | B: C 100% + M 100% |
| --- | --- |
| Blur (Text) | R: M 100% + Y 100% |
| | G: Y 100% + C 100% |
| | B: C 100% + M 100% |
| | Composite-K: C 100% + M 100% + Y 100% |
| White Spot | K 100% |

TABLE 1-continued

| Retransfer Density | K 20%, C 20%, |
| --- | --- |
| | K 100% |
| | B: C 100% + M 100% |

In Table 1, only specific colors are used for each image defect, but in practice, other colors may be additionally used or only some colors may be used. In addition, other defects may be employed in addition to the above-described defects.

FIG. 9 is a view illustrating an operation of determining a transfer condition according to an example.

Referring to FIG. 9, a patch region corresponding to each image defect is read out from a scanned calibration chart 900.

Patches 911 corresponding to a poor transfer may be divided into a plurality of blocks, and a color average and a color standard deviation for each of the divided plurality of blocks may be calculated in operation 912. A method for calculating a color average and a color standard deviation will be described below with reference to FIG. 17.

In addition, a poor transfer score may be calculated based on the calculated color average and color standard deviation in operation 913. A method for calculating a poor transfer score will be described below with reference to FIGS. 18 and 19.

In addition, a white spot size under each transfer condition may be calculated using patches 921 corresponding to a white spot error in operation 922, and a white spot score for each of the calculated white spot sizes may be calculated in operation 923. A method for calculating a spot size and the white spot score will be described below with reference to FIGS. 14 to 16.

In addition, a ternary patch image under each transfer condition may be generated using patches 931 corresponding to a blur error, and a blur rate under each transfer condition may be calculated using the generated ternary patch image in operation 932. An example operation of calculating a blur rate will be described below with reference to FIG. 11.

A blur score regarding each blur rate under each transfer condition may be calculated in operation 933. A method for calculating the blur score will be described below with reference to FIGS. 12 and 13.

In addition, patches 941 corresponding to a retransfer may be divided into a plurality of blocks, and a color average and a color standard deviation for each of the divided plurality of blocks may be calculated in operation 942. A method for calculating a color average and a color standard deviation will be described below with reference to FIG. 17.

In addition, a retransfer score may be calculated based on the calculated color average and color standard deviation in operation 943. A method for calculating a retransfer score will be described below with reference to FIGS. 20 and 21.

In addition, a scan gray or density may be detected from patches 951 in each transfer condition, and a scan gray score may be calculated in operation 952 based on the scan gray. This operation may be omitted in practice. In the above described score calculation operations, an image having a higher quality is given a lower numeric score or a "smaller-the-better" characteristic rating, examples of which will be explained in more detail below.

In response to the scores corresponding to the respective defects being calculated through the above-described processes, an image quality score may be calculated by adding the values of each transfer condition in operation 960. In this case, the scores for the respective image defects may be equally added, or, regarding a specific image defect, a weight value may be assigned to the score and then the scores may be added as shown in Equation 1 presented below:

Image quality score=α×Poor Transfer Score+β× White Spot Score+γ×Blur Score+δ×Retransfer Score         Equation 1

In response to the image quality score being calculated, from among a plurality of transfer conditions, a transfer condition that has a high image quality score or a transfer condition in which the detected scan gray falls out of a predetermined range may be removed from candidate transfer conditions in operation 965.

In addition, a transfer condition in which the score of a specific image defect has a predetermined range may be removed from the candidate transfer conditions as part of operation 965. For example, a transfer condition in which the score of a specific image defect is larger than the sum of averages and standard deviations of all conditions may be removed from the candidate transfer conditions. For example, a transfer condition in which the score of a blue blur is larger than the sum of the averages and standard deviations of all blur scores may be removed from the candidate transfer conditions.

In operation 970, a transfer condition having a low image quality score or a transfer condition in which the detected scan gray falls within a predetermined range may be included as a candidate transfer condition.

In response to one candidate transfer condition not being obtained through the above-described process, the predetermined range in the above-described process may be adjusted and the process may be repeated until one or more candidate transfer conditions are obtained in operation 975.

In response to only one transfer condition remaining, the corresponding transfer condition may be determined as a final transfer condition.

However, in response to a plurality of transfer conditions remaining, it may be determined whether the remaining transfer conditions are continuous, and, in response to the remaining transfer conditions being continuous, a transfer condition that has a low sum may be determined as the final transfer condition in operation 980.

In response to the transfer conditions not being continuous, a transfer condition that has a low sum of added scores and concentration scores may be determined as the final transfer condition in operation 985. However, in practice, only the sum of scores may be used and a transfer condition that has the low sum may be determined as the final transfer condition.

In the above-described example, the scan gray is calculated and is used to select the final transfer condition. However, in practice, the scan gray score may be used only to exclude some candidate transfer conditions and may not be used to determine the final transfer condition.

In the above-described example, the final transfer condition is determined through an operation including several processes. However, in practice, the final transfer condition may be determined using a method as shown in FIG. 10, which will be described below.

FIG. 10 is a view illustrating an operation of determining a final transfer condition when a plurality of transfer conditions are selected according to an example.

Referring to FIG. 10, a score for each of the image defects may be calculated in the same way as in FIG. 9 in operation 1010.

In addition, based on the calculated scores, a transfer condition that has a high sum of scores and a transfer condition that has a high scan gray score may be removed from candidates in operation 1020, and a transfer condition that has a low sum of scores and a transfer condition that has a low scan gray score may be determined as the final transfer condition in operation 1030.

In FIGS. 9 and 10, the scores corresponding to the respective image defects are calculated, and the final transfer condition is determined based on the calculated scores. However, in practice, it may be only determined whether there is a blur defect or whether there is a white spot defect using the calculated blur score or white spot score, and the final transfer method may be determined by combining a transfer condition that has no image defect and a related-art method.

For example, a transfer condition that has an image defect may be excluded from the plurality of transfer conditions and the final transfer condition may be determined by using the other transfer conditions and a related-art transfer condition determining method.

FIG. 11 is a view illustrating a method for evaluating a blur defect according to an example. FIG. 12 is a view illustrating an evaluation score of a blur defect according to an example. FIG. 13 is a view illustrating a relationship of an evaluation score to a blur rate using interpolation according to an example.

Referring to FIG. 11, an image including a peripheral region with reference to a rectangular patch of R, G, B colors of a calibration chart is extracted in operation 1110.

The extracted image may be gray processed in operation 1120. In this case, three images may be converted into one gray image using Equation 2.

$$\text{Gray} = 0.3 \times R + 0.59 \times G + 0.11 \times B \quad \text{Equation 2}$$

where Gray is a gray color value, R is a color value of an R patch, G is a color value of a G patch, and B is a color value of a B patch.

In addition, black and white thresholds may be determined adaptively according to the gray-processed image in operation 1130, and the gray-processed image may be ternarized according to the determined black and white thresholds in operation 1140. In the ternarized image, black may be regarded as a patch region, white may be regarded as a paper region, and gray may be regarded as a blur region.

The above-described black threshold may be determined by applying the Otsu's algorithm to the gray image including the peripheral region with reference to R, G, and B color patches of the scanned calibration chart. In addition, the above-described white threshold may be determined by calculating an "average −3×standard deviation" of the scanned gray value with reference to a pre-designated white region in the scanned calibration chart.

In addition, in the ternarized image, a blur rate may be calculated based on a rate of a gray region to the other region as shown in Equation 3 presented below:

Blur Rate=Number of Gray Pixels/Number of (Gray+White) Pixels     Equation 3

In FIG. 11, the blur rate is calculated using a text, but in practice, various graphic patterns such as lines, circles, polygons, etc. may be used.

The calculated blur rate may be converted into an evaluation score for evaluating image quality. To achieve this, images at respective blur rates may be shown to a plurality of users, and scores regarding the images may be received and average data may be obtained. For example, users may give a score of 1 when there is no blur, may give a score of 3 when the degree of blur is medium, and may give a score of 5 when the degree of blur is high. Examples of evaluation scores according to respective blur rates are shown in FIG. 12.

Referring to FIG. 13, a conversion equation for an evaluation score with respect to a blur rate may be calculated through modeling based on the above-described evaluation scores. FIGS. 12 and 13 illustrate a method for deriving the conversion equation using regression modeling, but in practice, a lookup table (LUT) or interpolation may be used.

FIG. 14 is a view illustrating a method for evaluating a white spot defect according to an example. FIG. 15 is a view illustrating an evaluation score of a white spot defect according to an example. FIG. 16 is a view illustrating a relationship of an evaluation score to a size of a white spot using interpolation according to an example.

Referring to FIG. 14, the white spot refers to a phenomenon in which an image is not fully filled and has a hole when solid colors (black, cyan, magenta, yellow) are outputted, and may be generated due to electric discharge generated at micropores when a sponge-type transfer roller is used.

First, smoothing is performed with respect to a black patch 1410 of a scanned transfer calibration chart in operation 1420. In addition, an edge may be detected with reference to pixels and a spot may be detected using a local threshold in operation 1430.

A spot size may be determined based on the largest value of width and height values of the detected spot. In practice, a spot size may be determined based on an area value of the width and the height of the detected spot.

In this way, all spots existing in the patch may be detected, and a size of a final spot may be determined by adding the sizes of the respective spots.

The calculated spot size may be converted into an evaluation score for evaluating image quality. To achieve this, test images of respective spot sizes may be shown to a plurality of users, and scores regarding the test images may be received and average data may be obtained. For example, users may give a score of 1 when there is no spot, may give a score of 3 when the spot size is medium, and may give a score of 5 when the spot size is large. Examples of evaluation scores according to respective spot sizes are shown in FIG. 15.

As shown in FIG. 16, a conversion equation for an evaluation score with respect to a spot size may be calculated through modeling based on the above-described evaluation scores. FIGS. 15 and 16 illustrate a method for deriving the conversion equation using regression modeling, but in practice, an LUT or interpolation may be used.

FIG. 17 is a view illustrating a method for evaluating a poor transfer defect and a retransfer defect according to an example. FIG. 18 is a view illustrating an evaluation score of a poor transfer defect according to an example. FIG. 19 is a view illustrating a relationship of an evaluation score to a poor transfer using interpolation according to an example. FIG. 20 is a view showing an evaluation score of a retransfer defect according to an example. FIG. 21 is a view illustrating a relationship of an evaluation score to a poor retransfer defect using interpolation according to an example.

The poor transfer defect may appear in the form of picking or graininess when paper contains moisture in a high-temperature and humidity environment for a long time and a transfer current leaks. In addition, the poor transfer may appear in the form of mottle due to the lack of an electric field for moving a toner when the toner is transferred by the electric field in a low-temperature and humidity environment.

To detect the poor transfer, a degree of uniformness of an outputted image is calculated using a B color patch of a scanned calibration chart in the present example. However, it should be understood that other color patches may be used instead.

Referring to FIG. 17, an area 1711 of 256 pixels×256 pixels may be extracted with respect to the B color patch 1710 of the scanned secondary transfer calibration chart. The extracted image 1720 may be gray processed and may be sub-sampled to the size of 32 pixels×32 pixels 1721.

In addition, an average (V) and a standard deviation (S) may be calculated for every sub-sampled block.

In addition, a mottle value may be calculated based on Equation 4 and a graininess value may be calculated based on Equation 5 presented below:

$$\text{Mottle: } \sqrt{\dfrac{\sum_{i=1}^{54}\left(\dfrac{\sum_{i=1}^{54} V_i}{64} - V_i\right)^2}{64}} \qquad \text{Equation 4}$$

where Mottle is a mottle value of a patch corresponding to a specific transfer condition, and Vi is an average of the i-th block.

$$\text{Grininess } \dfrac{\sum_{i=1}^{54} Si}{64} \qquad \text{Equation 5}$$

where Graininess is a graininess value of a patch corresponding to a specific transfer condition, and Si is a standard deviation of the i-th block.

In addition, a poor transfer value may be calculated using Equation 6 presented below:

$$\text{Poor Transfer} = 0.2 \times \text{Mottle} + 0.95 \times \text{Graininess} \qquad \text{Equation 6}$$

The calculated poor transfer value may be converted into an evaluation score for evaluating image quality. To achieve this, test images of respective poor transfer values may be shown to a plurality of users, and scores regarding the test images may be received and average data may be obtained. For example, users may give a score of 1 when there is no poor transfer, may give a score of 3 when the degree of poor transfer is medium, and may give a score of 5 when the degree of poor transfer is high. Examples of evaluation scores according to respective poor transfer values are shown in FIG. 18.

Referring to FIG. 19, a conversion equation for an evaluation score with respect to a poor transfer value may be calculated through modeling based on the above-described evaluation scores. FIGS. 18 and 19 illustrate a method for deriving the conversion equation using regression modeling, but in practice, an LUT or interpolation may be used.

The retransfer defect is a phenomenon in which electric discharge exceeding a transfer voltage is generated when an electric field is applied and thus a toner is returned, and may occur mainly in thick paper and bright color. A degree of uniformness of an outputted image may be calculated using a color patch of a low concentration of the scanned secondary calibration chart.

To detect the retransfer, the degree of uniformness of an outputted image is calculated using K and C color patches of a low concentration of the scanned calibration chart in the present example.

The degree of uniformness may be calculated in the same operations as in the case of the poor transfer, and thus a method for calculating a retransfer value will be described with reference to FIG. 17.

Referring to FIG. 17, an area of 256 pixels×256 pixels may be extracted with respect to K and C color patches of a low concentration of the scanned secondary transfer calibration chart. The extracted image may be gray processed and may be sub-sampled to the size of 32 pixels×32 pixels.

In addition, an average (V) and a standard deviation (S) may be calculated for every sub-sampled block.

In addition, a mottle value may be calculated based on Equation 7 and a graininess value may be calculated based on Equation 8 presented below:

$$\text{Mottle: } \sqrt{\frac{\sum_{i=1}^{54}\left(\frac{\sum_{i=1}^{54} V_i}{64} - V_i\right)^2}{64}} \qquad \text{Equation 7}$$

where Mottle is a mottle value of a patch corresponding to a specific transfer condition, and Vi is an average of the i-th block.

$$\text{Grininess } \frac{\sum_{i=1}^{54} Si}{64} \qquad \text{Equation 8}$$

where Graininess is a graininess value of a patch corresponding to a specific transfer condition, and Si is a standard deviation of the i-th block.

In addition, a retransfer value may be calculated using Equation 9 presented below:

Retransfer=0.7×Mottle+0.3×Graininess     Equation 9

The calculated retransfer value may be converted into an evaluation score for evaluating image quality. To achieve this, test images of respective retransfer values may be shown to a plurality of users, and scores regarding the test images may be received and average data may be obtained. For example, users may give a score of 1 when there is no retransfer, may give a score of 3 when the degree of retransfer is medium, and may give a score of 5 when the degree of retransfer is high. Examples of evaluation scores according to respective retransfer values are shown in FIG. 20.

As shown in FIG. 21, a conversion equation for an evaluation score with respect to a retransfer value may be calculated through modeling based on the above-described evaluation scores. FIGS. 20 and 21 illustrate a method for deriving the conversion equation using regression modeling, but in practice, an LUT or interpolation may be used.

FIGS. 22 to 27 are views illustrating various user interface windows which may be displayed on a display, such as the display of FIG. 2, according to an example.

For example, FIG. 22 illustrates an example of a user interface window for receiving a transfer calibration command.

Referring to FIG. 22, a user interface window 2200 includes a transfer calibration menu 2211. The transfer calibration menu 2211 may be arranged in a calibration and cleaning menu 2210 as a sub-menu.

In response to the transfer calibration menu 2211 being selected by the user, a user interface window may be displayed as shown in FIG. 23.

FIG. 23 illustrates an example of a user interface window for receiving printing paper information.

Referring to FIG. 23, the user interface window 2300 includes a paper size region 2311, a paper type region 2312, a duplex printing region 2313, a cancel region 2314, and a next region 2315.

The paper size region 2311 is a region for receiving selection of a size of paper currently loaded into a loading box (e.g., paper tray).

The paper type region 2312 is a region for receiving selection of a type of printing paper, for example, thick paper, coated paper, normal paper, etc.

The duplex printing region 2313 is a region for setting a transfer condition when simplex printing is performed (that is, when printing paper currently loaded is new paper), or setting a transfer condition when duplex printing is performed (that is, when printing paper currently loaded is used paper).

That is, the duplex printing region 2313 is a region for setting whether corresponding paper is used paper.

The cancel region 2314 is a region for receiving a command for returning to a previous step.

The next region 2315 is a region for receiving a command for proceeding to a next step.

In response to the next region 2315 being selected by the user, a user interface window may be displayed as shown in FIG. 24.

FIG. 24 illustrates an example of a user interface window for receiving a printing command.

Referring to FIG. 24, the user interface window 2400 includes a guide information region 2410 for guiding an arrangement form of a loading box, a cancel region 2420, and a print region 2430.

The guide information region 2410 is a region for displaying information for requesting to load corresponding paper in the loading box to correspond to printing paper information set by the user.

The cancel region 2420 is a region for receiving a command for returning to a previous step.

The print region 2430 is a region for receiving a command for printing a calibration chart.

In response to the print region 2430 being selected by the user, the image forming apparatus 100 may determine a transfer method according to the selected printing paper and an environment, and may print a corresponding calibration chart.

In response to the calibration chart being printed, a user interface window as shown in FIG. 25 may be displayed.

FIG. 25 illustrates an example of a user interface window which is displayed in response to the calibration chart being printed.

Referring to FIG. 25, the user interface window 2500 includes a guide information region 2510, a cancel region 2520, and a scan region 2530.

The guide information region 2510 is a region for displaying information indicating that the user should place the printed calibration chart on a scanner and press a scan command.

The cancel region 2520 is a region for receiving a command for returning to a previous step or stopping a current step.

The scan region 2530 is a region for receiving a command for scanning the calibration chart placed on the scanner.

In response to the scan region 2530 being selected by the user, the image forming apparatus 100 may scan the printed calibration chart, and may determine an optimal transfer condition using the scanned calibration chart as described above.

In response to the optimal transfer condition being determined, the image forming apparatus 100 may display a user interface window as shown in FIG. 26.

FIG. 26 illustrates a user interface window which displays a transfer condition in response to a transfer condition being determined according to an example.

Referring to FIG. 26, the user interface window 2600 includes an index region 2610, a cancel region 2620, and an OK region 2630.

The index region 2610 is a region for displaying an index which is determined for the printing paper selected by the user and adjusting the index, and may display an index 2611 for simplex printing paper, and an index 2613 for duplex printing paper (used paper).

The user may adjust the index using an operation button on the displayed index. For example, in response to the index for the duplex printing paper being adjusted by the user, a user interface window as shown in FIG. 27 may be displayed.

The cancel region 2620 is a region for receiving a command for canceling the transfer calibration operation.

The OK region 2630 is a region for receiving a confirmation command for setting a currently determined transfer voltage as a transfer voltage for previously selected printing paper.

FIG. 27 illustrates a user interface window for displaying a transfer condition in response to a transfer condition being determined according to an example.

Referring to FIG. 27, the user interface window 2700 includes an index region 2710, a cancel region 2720, and an OK region 2730.

The index region 2710 is a region for displaying an index, which is determined for printing paper selected by the user, and adjusting the index, and may display an index 2711 for simplex printing paper, and an index 2713 for duplex printing paper (used paper). Since the index for the duplex printing paper has been adjusted in FIG. 26, the adjusted value may be displayed.

The cancel region 2720 is a region for receiving a command for canceling the transfer calibration operation.

The OK region 2730 is a region for receiving a confirmation command for setting the currently determined transfer voltage as a transfer voltage for the previously selected printing paper.

For example, the index for the duplex printing paper may be adjusted by the user as shown in FIG. 27.

FIG. 28 is a flowchart illustrating a method for setting a transfer condition according to an example.

Referring to FIG. 28, a calibration chart in which rows of patches of different colors are repeatedly arranged in the sub-scanning direction is printed while changing a transfer condition in operation S2810. For example, a transfer method may be selected based on set printing paper, and a calibration chart corresponding to the selected transfer method may be printed. During the printing process of the calibration chart, the transfer condition may be changed in phases.

In addition, the printed calibration chart is scanned in operation S2820.

An image defect under each transfer condition is determined using the scanned calibration chart in operation S2830. For example, at least one image defect from among a blur defect, a white spot defect, a poor transfer defect, and a retransfer defect may be determined by using color patches in the scanned calibration chart. The method for determining each image defect has been described and thus a redundant explanation thereof is omitted.

A transfer condition of the image former is set based on the determined image defect in operation S2840. For example, a transfer condition that has an image defect may be excluded, and a transfer condition may be set by selecting any one of the other transfer conditions. Alternatively, a transfer condition having an image defect may be excluded, and a transfer condition may be set by selecting one of the other conditions using any one of an image quality score or a concentration score.

Accordingly, an image forming method may determine an image defect under each transfer condition and set a transfer condition according to the determined image defect, such that a printing job can be performed with best quality without degradation of image quality. The image forming method shown in FIG. 28 may be performed on the image forming apparatus having the configuration as shown in FIG. 1 or FIG. 2, or may be performed on image forming apparatuses having other configurations.

The above-described control method may be implemented by at least one execution program for executing the above-described image forming method, and such an execution program may be stored in a non-transitory readable medium.

The non-transitory readable medium refers to a medium that stores data semi-permanently rather than storing data for a very short time, such as a register, a cache, a memory or etc., and is readable by an apparatus. For example, the above-described various applications or programs may be stored in the non-transitory readable medium such as a compact disc (CD), a digital versatile disk (DVD), a hard disk, a Blu-ray disk, a universal serial bus (USB), a memory card, a ROM or etc., and may be provided The foregoing description is merely exemplary and is not to be construed as limiting. Rather, the above described examples can be readily applied to other types of apparatuses. Also, the description of the examples is intended to be illustrative, and not to limit the scope of the claims, and many alternatives, modifications, and variations will be apparent to those skilled in the art.

The invention claimed is:

1. An image forming apparatus comprising:
an image former to change a transfer condition while printing a calibration chart in which patches of different colors are repeatedly arranged in a sub-scanning direction;
a scanner to scan the printed calibration chart; and
a processor to:
determine an image defect under each transfer condition using the scanned calibration chart, and
set a transfer condition of the image former based on the determined image defect,
wherein the image former is to change the transfer condition by changing a voltage or a current used during a transfer process while printing the calibration chart.

2. The image forming apparatus of claim 1, wherein the processor determines the image defect as a blur defect, a white spot defect, a poor transfer defect, or a retransfer defect using color patches in the scanned calibration chart.

3. The image forming apparatus of claim 2, wherein the processor:
calculates an image quality score under each transfer condition by assigning a predetermined weight value to each of a plurality of determined image defects, and
determines a transfer condition based on the calculated image quality score.

4. The image forming apparatus of claim 3, wherein the processor:
excludes a transfer condition that has an image defect falling within a predetermined range from among the plurality of determined image defects, and
determines a transfer condition based on the calculated image quality score with respect to the other transfer condition.

5. The image forming apparatus of claim 1, wherein the processor:
calculates a blur rate under each transfer condition using color patches in the scanned calibration chart, and
determines the image defect based on the calculated blur rate.

6. The image forming apparatus of claim 5, wherein the processor:
generates a ternary patch image under each transfer condition using a red patch, a green patch, and a blue patch in the scanned calibration chart, and
calculates the blur rate under each transfer condition using the generated ternary patch image.

7. The image forming apparatus of claim 1, wherein the processor:
detects a spot existing in a black patch in the scanned calibration chart using the black patch, and
calculates a size of a spot under each transfer condition.

8. The image forming apparatus of claim 1, wherein the processor:
divides a blue patch in the scanned calibration chart into a plurality of blocks,
calculates a color average and a color standard deviation with respect to each of the divided plurality of blocks, and
calculates a poor transfer value under each transfer condition based on the calculated color average and standard deviation.

9. The image forming apparatus of claim 1, wherein the processor:
divides each of a black patch and a cyan patch in the scanned calibration chart into a plurality of blocks,
calculates a color average and a color standard deviation with respect to each of the divided plurality of blocks, and
calculates a retransfer value under each transfer condition based on the calculated color average and standard deviation.

10. The image forming apparatus of claim 1, wherein the calibration chart comprises:
a first patch region in which red, green, blue, and black using cyan, magenta, yellow (CMY) toners are repeatedly arranged in the sub-scanning direction;
a second patch region in which black using a black toner is repeatedly arranged in the sub-scanning direction; and
a third patch region in which black using a black toner and cyan are repeatedly arranged with a predetermined low concentration in the sub-scanning direction.

11. The image forming apparatus of claim 10, wherein, in the first patch region, each of the red, the green, the blue, and the black is presented in the form of a text or a predetermined figure.

12. The image forming apparatus of claim 1, wherein the processor:
determines a transfer method,
generates the calibration chart having a distance between patches in the sub-scanning direction according to the determined transfer method, and
controls the image former to print the generated calibration chart.

13. An image forming method of an image forming apparatus, the method comprising:
printing a calibration chart in which patches of different colors are repeatedly arranged in a sub-scanning direction while changing a transfer condition;
scanning the printed calibration chart;
determining an image defect under each transfer condition using the scanned calibration chart; and
setting a transfer condition of an image former based on the determined image defect,
wherein the changing of the transfer condition includes changing a voltage or a current used during a transfer process while printing the calibration chart.

14. The method of claim 13, wherein the determining comprises determining the image defect from a blur defect, a white spot defect, a poor transfer defect, or a retransfer defect using color patches in the scanned calibration chart.

15. The method of claim 13, wherein the setting comprises:
calculating an image quality score under each transfer condition by assigning a predetermined weight value to each of a plurality of determined image defects; and
determining a transfer condition based on the calculated image quality score.

16. A non-transitory computer-readable storage medium storing instructions that are executable by a processor, the non-transitory computer-readable storage medium comprising:
instructions to print a calibration chart in which patches of different colors are repeatedly arranged in a sub-scanning direction while changing a transfer condition;
instructions to scan the printed calibration chart;
instructions to determine an image defect under each transfer condition using the scanned calibration chart; and
instructions to set a transfer condition of an image former based on the determined image defect,
wherein the instructions to change the transfer condition include instructions to change a voltage or a current used during a transfer process while printing the calibration chart.

17. The non-transitory computer-readable storage medium of claim 16, wherein the instructions to determine comprise instructions to determine the image defect from a blur defect, a white spot defect, a poor transfer defect, or a retransfer defect using color patches in the scanned calibration chart.

18. The non-transitory computer-readable storage medium of claim 16, wherein the instructions to set comprise:
instructions to calculate an image quality score under each transfer condition by assigning a predetermined weight value to each of a plurality of determined image defects; and instructions to determine a transfer condition based on the calculated image quality score.

19. The non-transitory computer-readable storage medium of claim 16, further comprising:
instructions to determine a transfer method;
instructions to generate the calibration chart having a distance between patches in the sub-scanning direction according to the determined transfer method; and
instructions to control the image former to print the generated calibration chart.

* * * * *